United States Patent [19]
Atkins

[11] 3,748,880
[45] July 31, 1973

[54] LOCK ASSEMBLIES PARTICULARLY SUITABLE FOR MOTOR VEHICLES

[75] Inventor: Barry Keith Atkins, Sittingbourne, Kent, England

[73] Assignee: Waso Limited, Kent, England

[22] Filed: Mar. 17, 1971

[21] Appl. No.: 125,264

[30] Foreign Application Priority Data
Mar. 18, 1970 Great Britain.................. 13,049/70
May 8, 1970 Great Britain.................. 22,375/70
Oct. 9, 1970 Great Britain.................. 48,171/70

[52] U.S. Cl...................... 70/248, 70/181, 292/150
[51] Int. Cl. ............................................. B60r 25/06
[58] Field of Search...................... 70/181, 184, 185, 70/186, 238, 239, 241, 247, 248, 252, DIG. 32

[56] References Cited
UNITED STATES PATENTS

| | | | |
|---|---|---|---|
| 1,650,651 | 11/1927 | Preston | 70/252 |
| 1,280,589 | 10/1918 | Trosien | 70/247 |
| 1,462,137 | 7/1923 | Hill | 70/185 |
| 2,637,789 | 5/1953 | Critchfield et al. | 200/44 |
| 1,599,201 | 9/1926 | Boughton | 70/247 |
| 1,602,648 | 10/1926 | Carson | 70/248 |
| 1,592,977 | 7/1926 | Johnson | 70/251 X |
| 1,458,244 | 6/1923 | Reeves et al. | 70/252 |

*Primary Examiner*—Albert G. Craig, Jr.
*Attorney*—Kurt Kelman

[57] ABSTRACT

A lock assembly particularly, but not exclusively, for use in conjunction with a vehicle gear box selector shaft housing for locking against movement at least one selector shaft to immobilise at least partially a vehicle, the assembly including a locking mechanism which is key-operated and basically comprises a housing, a drive member in the housing and a drive member head for transmitting movement of the key via the drive member to a locking detent.

1 Claim, 28 Drawing Figures

Inventor
BARRY K. ATKINS

By Kurt Kelman
AGENT

Inventor
BARRY K. ATKINS

By Kurt Kelman

AGENT

LOCK ASSEMBLIES PARTICULARLY SUITABLE FOR MOTOR VEHICLES

The invention concerns lock assemblies. In particular the invention concerns lock assemblies which are readily usable for securing, against theft, motor vehicles.

Whilst locks in accordance with this invention may be applied to various components of motor vehicles and whilst they could be applied to different applications such as for immobilising static machinery as a safety precaution, for example, to prevent misuse of that machinery or for the safety of an operative carrying out servicing of the machinery, the invention particularly concerns locking mechanisms which may be secured to, or incorporated in, the structure which surrounds the selector shafts of motor vehicle gear boxes so that at least one gear box selector shaft may be locked in a predetermined position to prevent satisfactory operation of the gear box and thus, at least partially to immobilise the vehicle with which the mechanism is associated.

The locking of a vehicle's gear box selector shaft has many advantages for whilst it has, in the past, been proposed to lock the steering of a vehicle and indeed the gear level which controls movement of the selector shafts, it is now proposed that a very simple readily and cheaply manufactured lock which is directly effective against at least one such selector shaft is generally more satisfactory to the motor trade insofar that the structure surrounding the selector shaft(s) can be manufactured easily in a manner to provide means whereby a locking mechanism in accordance with this invention can either readily be fitted as standard equipment or equally such mechanism may be fitted as optional equipment or subsequent to sale of the vehicle as a separate accessory. The locking of a gear box selector shaft has the additional advantage, at least over and above the use of locking a vehicle's steering mechanism as being equally suitable for left and right-hand drive vehicles, no modification to the mechanism or the vehicle's parts being necessary unlike in the case of locking of a vehicle steering mechanism where many special "handed" components have to be provided.

The extreme mechanical simplicity of the locking mechanisms in accordance with this invention is commercially desirable as simplicity aids reliability and thus safety. Because of such simplicity the assemblies may be compact and versatile to suit many different applications. In preferred embodiments key movement can be minimised and the angular position of the key lock cylinder may be chosen to facilitate operation of the assembly by the user. Furthermore mechanical loads on the mechanism are minimal and thus the user may operate the assembly with ease.

Very conveniently the locking mechanism would be associated with one or more switch means in circuit with the ignition circuitry of the motor vehicle, starting circuitry and/or circuitry controlling the vehicle's engine fuel supply. Reference is made to controlling the vehicle's engine fuel supply in view of the now common use of diesel engines where, it will be understood, mere isolation of the ignition circuit is not necessarily sufficient to prevent starting of a diesel engine, such diesel engines being capable of being started without use of the normal heater plugs (at least in many climatic conditions or once the engine is warm).

Broadly therefore the invention concerns a mechanically simple key operated locking mechanism for locking, against movement, a movable shaft as claimed hereinafter. More specifically the invention comprises a vehicle transmission locking assembly including not only a key operated locking mechanism but also structure for containing a locking detent movable between at least two positions with respect to the structure, such detent being adapted to engage at least one selector shaft of a vehicle gear box, such selector shaft being positioned within, or adjacent, the said structure as hereinafter described and claimed.

In order that the invention may be more readily understood, and further features of the same more readily appreciated, embodiments of locking meachanism for combination with a gear box selector shaft assembly housing to provide a gear box lock assembly will now be described by way of example and with reference to the accompanying drawings in which.

Figure 1:
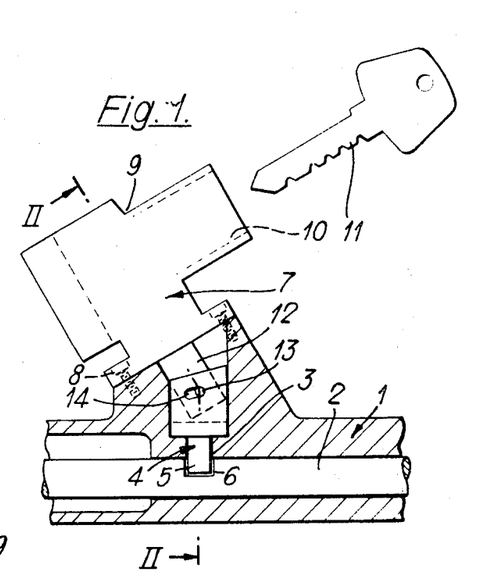
FIG. 1 is a very diagrammatic view of the first embodiment of locking mechanism showing its application to a vehicle gear box selector shaft housing, this FIG. 1 showing the mechanism in a selector shaft locking position.
Figure 2:
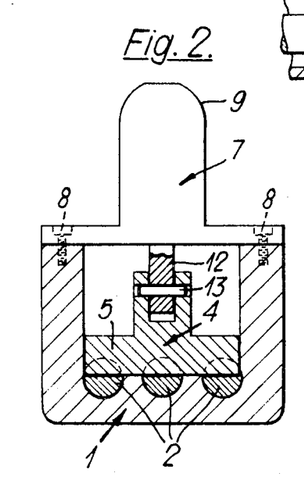
FIG. 2 is a transverse sectional view on the line II—II of FIG. 1.

In a first embodiment a gear box selector shaft assembly housing generally designated 1 contains a plurality of selector shafts 2 disposed in a single plane and in spaced parallelism, the housing at least in part surrounding such selector shafts and such housing being provided with an opening located to one side of the surface of said plane. The housing, in the region of said opening, defines a guideway 3 in which a locking abutment 4 in the form of a slidable locking bolt moves, the direction of movement of said locking bolt 4 being transverse of said plane. The locking bolt 4 is movable in the guideway between a first unlocking position remote from the shafts 2 and a second locking position in which an end or abutment portion 5 of the bolt 4 lies in engagement with, and bridges, the shafts 2 by means of a locking mechanism.

Whilst the shafts 2 could be provided with any means such as, for example, upstanding protuberances which engage the abutment portion 5 of the bolt 4 when the latter is in said locking position, in this particular embodiment the shafts are each provided with a transverse keyway 6 which receives said abutment portion 5 when the locking bolt 4 is in its locking position.

In this construction the locking bolt 4 is of generally inverted T-shaped cross section, the cross piece of the T constituting the abutment portion 5 and being arranged, as stated above, to bridge the selector shafts 2. Furthermore in this embodiment the locking bolt 4 is arranged to slide in its guideway in a direction at right-angles to the plane of the selector shafts 2 but for convenience of operation the locking mechanism generally designated 7 is forwardly inclined with respect to the direction of movement of said bolt.

Figure 3:
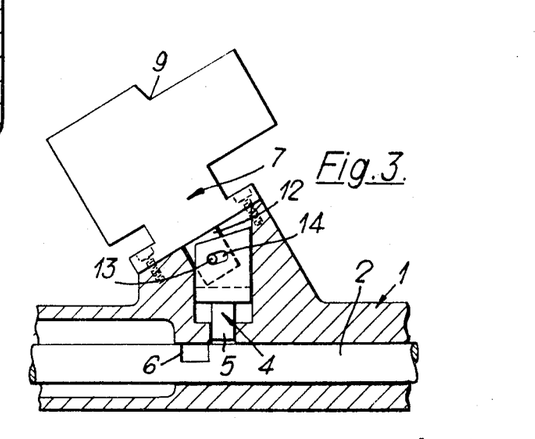
FIG. 3 is a diagrammatic view as is FIG. 1 but showing the mechanism in an unlocking position.

The locking mechanism 7, which is secured by a plurality of shear bolts 8 in its forwardly inclined position adjacent the opening in the housing comprises a body 9 housing a lock barrel which in turn contains a key operable lock cylinder 10. Mechanism associated with the cylinder 10 is provided to transmit movement applied to the lock cylinder (in response to, for example, rotary movement of a key 11 located therein) to a bolt operating member 12 which moves into or out of its body 9 and this member is coupled to the end of the locking bolt 4 remote from said selector shaft engaging abutment portion 5 by a transverse pin 13. End portions of this pin 13 are located in a braod transverse slot 14 provided in the locking bolt 4. The purpose of providing this slot 14 is to enable any movement of the bolt operating member 12 into and out of its body 9 to be transmitted as corresponding movement to the locking bolt 4 even though the direction of movement of the bolt operating member 12 is inclined to the direction of movement of the locking bolt 4 itself.

As hereinbefore stated, the lock cylinder may also operate means which control an electrical switch generally designated 13a in circuit with, for example, the ignition and engine starting circuitry of a motor vehicle.

The transverse keyways 6 provided in the gear box selector shafts 2 are conveniently and preferably positioned so that when the gear level controlling the movement of the selector shafts is situated in a neutral position, the keyways 6 will lie precisely beneath said abutment portion 5 of the locking bolt 4. Such keyways 6 could be provided so that they are located beneath the abutment portion 5 when reverse gear is engaged. If this latter arrangement were adopted it would be particularly desirable, if not essential, to ensure that an eletrical switch be provided for cooperation wih the gear lever, the selector shafts of associated mechanism which would prevent the starter motor of the vehicle engine from operating while its gear box is locked with reverse gear engaged. In this way inadvertent starting of the engine with reverse gear selected and with the vehicle's clutch engaged (or even disengaged) would be obviated. Such switch could conveniently be actuated by co-operation with an appropriate selector shaft. It is to be noted, of course, that keyways may be provided so that a user of the locking mechanism may selectively choose to lock the gear box either in neutral or alternatively, for example, in reverse gear.

It will be understood that by appropriate shaping of the end of abutment portion 5 and the mechanism associated therewith that this lock assembly can be used to lock any desired number of selector shafts 2.

In operation, assuming that the locking mechanism is locking the selector shafts with the gear lever in a neutral position, it is merely necessary for the driver of the vehicle, to effect operation of the locking mechanism, to rotate the key 11 in the lock cylinder 10 so that the selector shafts will be freed, such movement of the lock cylinder 10 resulting in withdrawal of the bolt operating member in a direction towards its body 9 and so that corresponding movement of the locking bolt 4 from its second locking position towards its first unlocking position occurs. Such movement of the locking mechanism will also result in closing of the electrical switch 13a (when provided) so that the ignition system of the engine of the vehicle may be energised.

When it is desired to stop and leave the vehicle in a locked condition it is merely necessary for the gear lever to be placed into a neutral position and the lock cylinder 10 rotated by the key 11 and the key withdrawn so that the bolt operating member 12 may move out of its body with the result that the locking bolt 4 will also move into its locking position with the abutment portion thereof 5 engaged in the selector shaft keyways 6. Advantageously the bolt operating member and/or locking bolt will be spring biased towards the bolt locking position.

In the first embodiment described the locking abutment has been described as a slidable bolt 4. It will be understood, however, that the locking abutment may take many forms other than a slidable bolt or pin and in a second embodiment of the invention a ball constitues such locking abutment.

Figure 4:
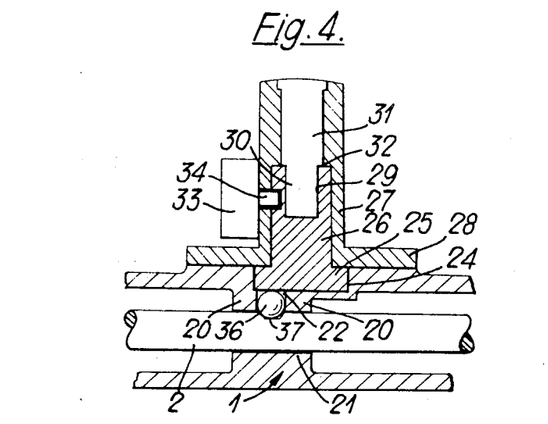
FIG. 4 is a part diagrammatic sectional view of a second embodiment of locking mechanism showing its application to a vehicle gear box selector shaft housing, this FIG. 4 showing the mechanism in a so-called "locked" position with a selector shaft locked in a predetermined position relative to its housing.

Thus in the second embodiment a series of selector shafts 2 are again housed within a housing 1 and such housing 1 has internal, integral flanges 20, 21 which terminate adjacent selector shafts 2, flanges 20 having an opening 22 extending therethrough which communicates with a circular rebate 24 formed asymmetrically of the opening 22 on the outer surface of the housing 1. Located for rotary movement in said rebate 24 is a similarly shaped head 25 formed integrally with a cylindrical drive member 26 which is located for rotary movement within a tubular body 27 secured (by shear bolts not shown) to the housing 1 through the intermediary of an outwardly directed circumferential flange 28 which is formed on such body 1.

The end portion of the drive member 26 remote from said head 25 is provided with a square sectioned blind bore 29 for receiving a square sectioned spigot 30 protruding from the end portion of a lock cylinder and barrel 31 mounted for rotary movement about the longitudinal axis of the tubular body 27 and similarly lying on the axis of rotation of said drive member 26. Movement of the drive member along the longitudinal axis of the body 27 is prevented by stepping inwardly the inner surface of the wall of such body to provide an abutment 32. Corresponding movement of the lock cylinder (i.e., a cylinder embracing and locating the lock cylinder in a known manner) is prevented by the provision of a transverse locking pin (not shown) which is provided to extend through the wall of the body into the cylinder forming the outer part of the lock barrel, in said well established manner.

Carried on one side of the tubular body 27 is an electrical quadrant switch 33 and an actuating element 34 of such switch passes through an aperture in the wall of the tubular body 27 and engages a cam surface provided by the base of a groove in, and by, the drive member 26 so that any rotary movement of such drive member 24 is transmitted to the switch actuating member 34.

The head 25 of the drive member 26, which is located in the circular rebate 24, whilst having a smooth periphery conforming with the periphery of the rebate, has an undersurface which lies in contact with the base of the rebate but such undersurface of the head 25 is recessed at 35 to produce a cam surface which may be arranged, when desired, to lie above said opening 22 which extends through the selector shaft housing 1. Said opening 22 has located therein for movement with respect thereto, a spherical ball 36 which is kept captive within the opening by said drive head 25 and the presence of a selector shaft 2 beneath said opening 22 prevents such ball from falling downwardly to an extent which would free the ball 36 from the opening.

The selector shaft 2 which is located beneath the opening 22 and thus beneath the ball 36 provided therein, has a shallow notch 37 having chamfered edges and the notch 37 is of sufficient size to enable a portion of the ball to enter the same when such notch is located immediately beneath the opening. The depth of the notch 37 is such that when the ball is located therein, the uppermost part of the ball 36 (that is the part which lies remote from the notch 37) lies flush with the base of the rebate 24 and thus when the unrecessed portion of the undersurface of the head 25 is located above the opening 22 the ball is locked in the notch 37 and the selector shaft 2 cannot be moved with respect to the ball 36. Because of this arrangement it will be understood that the drive member head 25 cannot be rotated in the rebate 24 (in response to rotation of the lock cylinder 31) into a position where the unrecessed portion lies over the opening except when the ball 36 is located in the notch 37 in the selector shaft 2.

However, the depth of the recess 35 in the head 25 of the drive member 26 is dimensioned to be sufficient to permit the ball to float upwardly and downwardly in the opening 22 towards and away from the selector shaft 2 when such head is orientated in a manner where the recessed portion thereof lies over the said opening. It will be understood that in this condition the selector shaft 2 is completely free for movement as movement of the notch with respect to the opening 22 merely causes the ball to be forced upwardly into such opening so that its upper portion protrudes into the recessed part 35 of the head 25 of the drive member 26. It is for this reason that the notch 37 has chamfered walls.

Figure 4A:
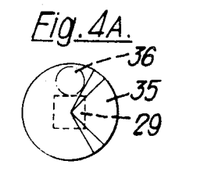
FIGS. 4A and 4B are respectively fragmentary underneath and side views of the drive member, head, recessed part of the head and locking ball of the mechanism shown in the "locked" positions of FIG. 4.
Figure 4B:
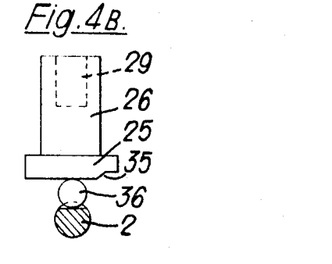

In this particular embodiment the recess 35 in the head 25 of the drive member 26 extends over an arc of approximately 60° and is positioned angularly on the head to correspond with particular positions of the electrical switch actuating element 34 which is responsive to movement of the drive member as described hereinbefore. As will further be mentioned hereinafter the extent of said arc may usefully be reduced. The arrangement is such that, in a "locked" position the electrical switch is open and the unrecessed part of the head 25 lies above the ball as in FIG. 4, 4A and 4B; in an "off" position the electrical switch is open and the recessed part 35 of the head 25 lies above the ball 36 giving the ball freedom of movement as in FIGS. 5, 5A and 5B; in an "ignition on" position a part of the electrical switch controlling the vehicle ignition circuitry is closed and the recessed part 35 of the head lies above the ball 36 again giving the ball freedom of movement as in FIGS. 6, 6A and 6B; and in a "start" position the part of the electrical switch controlling the vehicle ignition is closed, the part of the electrical switch controlling the vehicle starter motor circuit is also closed and the recessed part of the head lies above the ball again providing freedom of movement thereof. This position is not specifically shown in the drawings but it will be apparent from FIG. 5 that the driver 26 can be rotated through a further distance because of appropriate dimensioning of the recessed part 35.

As stated above freedom of movement of the ball permits free movement of the notched selector shaft.

In this particular embodiment the "off" position is displaced from the "locked" position by an arc of 60°, the "on" position is displaced from the "off" position by a further 30°, and the "start" position is displaced from the "ignition on" position by a still further 30°, so that a key controlling movement of the lock barrel 31, and thus movement of the drive member 26, must be moved through an arc of 120° to change the mechanism from a "locked" position to a "start" position. The extent of this angular movement between the "locked" and "start" positions can be reduced if required.

It will be understood, therefore, that once the key has been introduced into the lock barrel 31 and has been rotated through an angle of 60° or more from the locked position (FIG. 6), the selector shaft 2 will be free to move because the ball 36 is provided with freedom of movement in the opening. It should be noted however that the key cannot be returned (beyond the "off" position of FIG. 6) to the "locked" position of FIG. 5 unless the selector shaft is in a condition where its notch 37 lies beneath the ball 36 as, as described hereinbefore, whenever the ball 36 is outside such notch 37 its upper portion protrudes into the circular rebate 24 and prevents the head 25 from turning in response to the exertion of rotary movement on the drive member 26 by the key.

The lock barrel 31 is of a kind in which the key can only be removed therefrom when the latter is positioned in certain particular angular positions and in this particular embodiment the barrel is arranged only to permit withdrawal of the key when the barrel 31 is in the position where the drive member 26 is in the "locked" position.

Thus, whilst the user of the vehicle may unlock the gear box selector shaft, close the vehicle's ignition circuit, start and/or stop his vehicle by movement of the key, he cannot then remove the key from the lock until he has at least moved gear lever of the vehicle into a position where the notched selector shaft lies in a position in which its notch 37 lies beneath the ball 36 as this situation must be accomplished before he can rotate the key so that the mechanism takes up its "locked" position at which time the key can be removed.

As stated before with regard to the first embodiment an electrical isolater switch may readily be incorporated to ensure that the starter motor electrical control circuit cannot be closed when the selector shaft is in a condition where a gear in the gear box is engaged. Furthermore, as explained in relation to the first embodiment whilst the notch would, of course, normally be placed on the selector shaft in a position where a gear would not be engaged it could, by inclusion of said isolater switch be possible to arrange for locking to occur with a gear selected (for example reverse gear) or to provide for locking by choice either in a gear (reverse or otherwise) or in neutral.

In the second embodiment described above the tubular body extends away from the selector shaft or shafts at right-angles to the direction of movement thereof. It will be understood, of course, that the body could equally well be inclined to such direction of movement. Equally the mechanism may be varied in many ways without departing from the scope of this invention.

Figure 7:
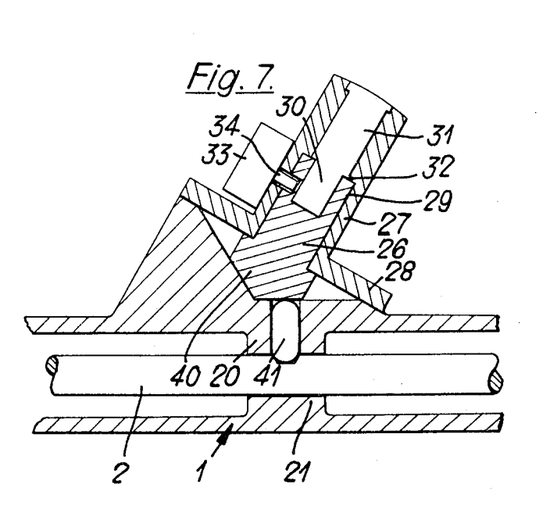
FIG. 7 is a diagrammatic sectional view of a third embodiment of locking mechanism as applied to a vehicle gear box selector shaft housing.

For example, in a third embodiment the drive member 26 may be inclined to the direction of movement of the selector shafts 2 and its head, as shown in FIG. 7 and designated 40 may be conical in form, an undersurface of such cone being recessed and acting upon a circular sectional pin 41 having hemispherical ends, such head 40 and pin 41 acting in exactly the same manner as the ball 36 and recessed head 25 described in connection with the second embodiment. If required the pin 41 may be retained in the housing of the mechanism so that the locking mechanism comprises a self-contained structure which is merely applied to a gear box selector shaft housing, it being merely necessary to provide in such housing an opening to permit passage of the pin 41. In this way mass production vehicles once being provided with a notched selector shaft and an apertured selector shaft housing, may readily and optionally be provided with a locking mechanism.

Figure 8:
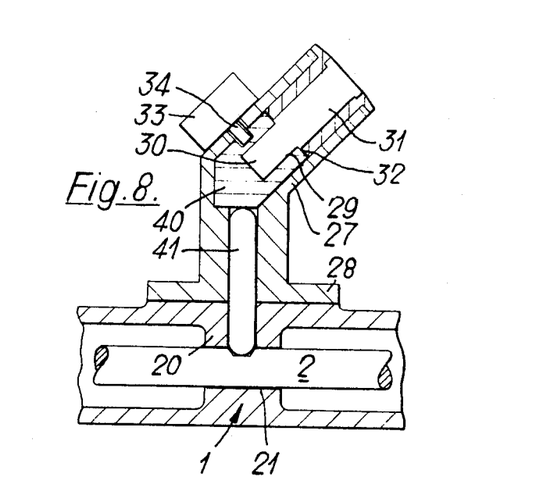
FIG. 8 is a view similar to FIG. 7 but showing a modification of the embodiment of FIG. 7.

To suit varying circumstances the pin 41 and surrounding housing may take varying dimensions as exemplified by the modification shown in FIG. 8.

Figures 5, 5A, 5B:
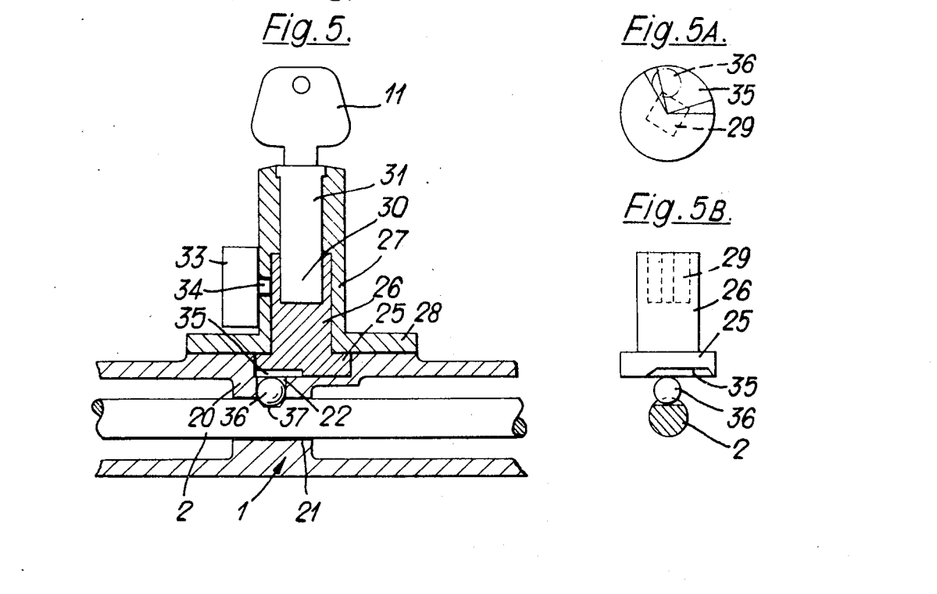
FIGS. 5, 5A and 5B are figures similar to FIGS. 4, 4A and 4B showing the mechanism in a so-called "off" position.
Figure 6:
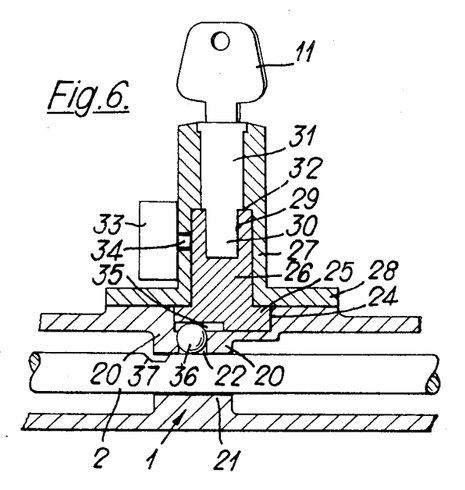
FIGS. 6, 6A and 6B are figures similar to FIGS. 4, 5; 4A, 5A; and 4B, 5B; but showing the mechanism in a so-called "ignition on" position.
Figure 6A:
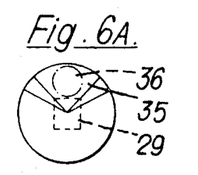
Figure 6B:
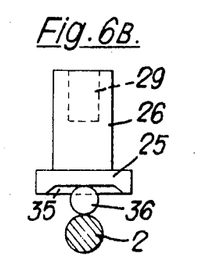

In the second embodiment shown in FIGS. 4 to 6 a single ball 36 was used to engage a single selector shaft 2. It should be understood, however, that more than one ball 36 and notched selector shaft 2 may be utilised and in such an arrangement the balls would conveniently be bridged by an appropriately shaped, floating, bridging member which carries on its upper surface a protuberance, such bridging member being dimensioned so that only when all the balls 36 are located in their respective notches 37 will the bridge fall to a position where the protuberance carried thereby does not extend into a position where it fouls the unrecessed part of the drive member head 25.

Figure 9:
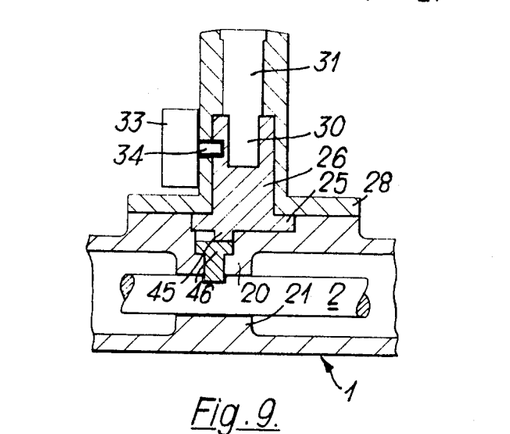
FIGS. 9 and 9A are respectively sectional and fragmentary views of a further modified embodiment of locking mechanism.
Figure 9A:
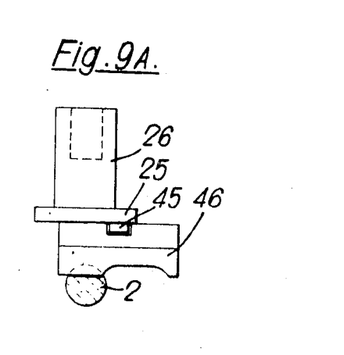

The ball 36 in the opening which co-operates with the drive member head 25 and the notched selector shaft 2 in the second embodiment described above was arranged so that the ball protruded into the circular rebate housing the drive member head except when the ball was located in the notch. It should be noted however that the drive member head 25 may have means 45 which actually protrude into said opening 22 rather than for the drive member head 25 merely to pass over the upper end of such opening 22 and in such an arrangement the notch 37 and ball 36 need not be dimensioned so that the ball protrudes from the upper end 22 of the opening into the recess 24 and all that would be required is for the ball 36 and notch 37 to be dimensioned so that when the ball 36 is not located in the notch 37 the upper surface of the ball 36 would protrude above a predetermined level within said opening 22, such level being such as to lie within the path of the means 45 which protrude into the opening so that the ball fouls such means. FIGS. 9 and 9A show such a modification and also use of a bridge (designated 46) and the use of more than one ball 36.

Figure 10:
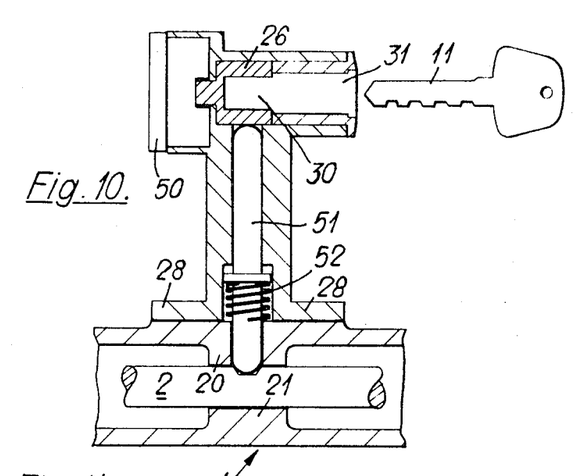
FIG. 10 is a further diagrammatic sectional view of a further alternative embodiment of locking mechanism.

In the description of the second embodiment, and of the possible modifications thereof, the electrical switch is operated in response to its actuating means 34 following a cam surface on the drive member 26 whereas the locking abutment, whether it be a pin or ball, has been operated by the head of the drive member 26. The arrangement could equally well (in certain applications) be reversed as shown in FIG. 10 so that a rotary electrical switch 50 is located for rotation about the longitudinal axis of the drive member 26 and lock barrel 31 and the pin or ball (a pin 51 being shown in FIG. 10) is moved in response to a portion thereof following a cam surface on the side of the drive member 26 which extends parallel to the axis of rotation of the drive member 26, the pin 51 being urged into engagement with the cam surface by appropriate spring means 52.

As stated hereinbefore with particular reference to the second embodiment of locking mechanism it is often desirable to minimise the extent of angular movement of the key which controls movement of the mechanism between the "locked" and "start" positions and by appropriate adjustment of the extent of the recessed part of the head 25, by changing the diameter of said head 25, and by adjustment of the switch 33, or of the mechanism controlling operation of the switch, it is possible to reduce the extent of such overall movement to 90°.

It is further noted that in the said second embodiment the drive member 26 has an integral head 25. In certain instances it is preferable to construct the member and its head in two parts and then rigidly to interconnect the same. This obviates certain production difficulties and enables the use of a common head in conjunction with locking mechanisms having varying body lengths.

Whilst wafer lock cylinders (for double sided keys) may be used as and where desired it is often preferable to utilise pin tumbler lock cylinders.

It will be understood that it is necessary, or at least very desirable to have spring means for biasing the key and associated parts away from the "start" position. Such spring means can on occasion be provided in the electrical switch itself. However where this is not practical spring means may be associated with the parts driven by the lock cylinder, such spring means only becoming energised after the mechanism has reached the "on" position and is moved towards the "start" position. One typical arrangement would be to provide a helical torsion spring having one end engaged by the parts driven by the lock cylinder whilst the other end remains free until the said parts driven by the lock cylinder are rotated to the "on" position whereupon the free end engages a fixed part of the mechanism. In this way, once such parts reach the "on" position and are moved towards the "start" position the torsion spring becomes progressively energised.

It should be appreciated that locks in accordance with this invention may equally well be applied to vehicles having automatic gear boxes where it is still necessary to provide a gear selector linkage.

It is to be noted that the lock mechanisms may be constructed as a completely replaceable unit so that in case of failure of a component such as the electrical switch the entire unit may readily be replaced with another. In such a construction, conveniently means would be provided to permit easy removal of the lock cylinder so that it may be readily reintroduced into a replacement locking mechanism. In this way it is possible to maintain lock cylinders which match, for example, the lock cylinders of other locks of the vehicle when this is desired and also to minimise the number of lock cylinders of different key combinations necessary thereby reducing the numbers of overlapping key combinations.

A suitable embodiment having this facility to keep a lock cylinder of an inoperative lock mechanism for insertion into a replacement mechanism will now briefly be described.

Figure 11:
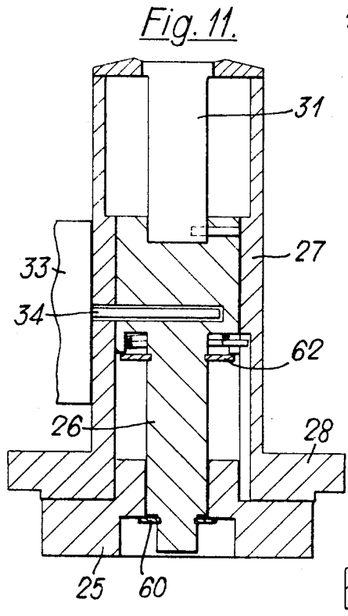
FIG. 11 is a medial sectional view of yet another embodiment of locking mechanism, this embodiment being readily capable of being dismantled for part replacement.

This embodiment, shown in FIG. 11 is basically of the same construction as certain other embodiments referred to hereinbefore and which have been described as having a tubular body 27 housing a drive member 26 for transmitting rotary movement of a key in a lock cylinder 31 to electrical switch means 33 and to a drive member head 25 which causes locking to be effected.

In this particular embodiment however the head 25 is formed separately but is retained on the drive member 26 by a circlip 60 or any other suitable releasable securing means. In this embodiment the spring means (which is outside the electrical switch means rather than being within the switch means as has been the case in the embodiments described specifically hereinbefore) is also provided in the form of a helical spring 61 as has been described in general terms hereinbefore but in this specific embodiment a further circlip 62 is provided to retain such spring means in its normal operating position in relation to the drive member 26.

The head 25 engages the base of the tubular housing 27 and as a result of being coupled, via a circlip to the drive member 26 and as a result of the drive member being coupled to the lock barrel by a pin 63 the assembly cannot be withdrawn from the lock-end of the body 27. However because of the use of circlips as a means for interconnecting the various parts, the mechanism can, once the tubular housing 27 is disconnected from its operative position on, for example, a vehicle gear box selector shaft housing, be readily disassembled to enable withdrawal of the lock cylinder thereby enabling the same cylinder, assuming it not to be damaged, to be reinserted into a replacement lock mechanism where the mechanism, or electrical switch associated therewtih, is damaged.

Figure 12:
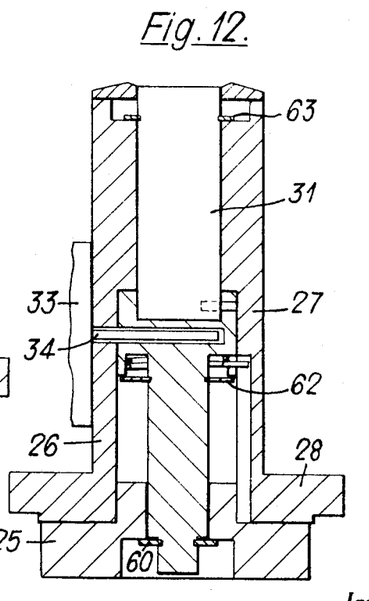
FIG. 12 is a view very similar to FIG. 11, showing the use of a wafer lock cylinder.

This construction, whilst utilizing a pin tumbler lock may be modified readily to receive a wafer lock as shown in FIG. 12. Where a wafer lock is provided a further circlip 63 would have to be included to retain the assembly, as a whole, in its correct location in the body.

In the pin tumbler lock arrangement as shown in FIG. 11 the lock cylinder 3 and driver 26 are introduced into the body from the lock-end thereof, the lock-end of the assembly engaging the periphery of the body so that the whole assembly becomes locked in position once the drive member head 25 is applied to the drive member 26 and held in its operative position by the said circlip 60.

On the other hand in the wafer lock arrangement of FIG. 12 the whole assembly is introduced from the drive head-end of the body (after the head 25 is coupled to the driver 26) and the assembly is retained in its operative position by said further circlip 63 which is applied about the lock, the drive head 25 again preventing the assembly from being withdrawn from the lock-end of the body and the further circlip 63 merely being provided to prevent the assembly from falling towards said head end of such body prior to assembly on a housing 1.

In all the embodiments described hereinbefore spring means for returning, for example, the mechanism from a "start" to an "ignition on" position have been described either as being included in the electrical switch means, or alternatively have been described very generally as being merely in the form of a simple helical torsion spring. Further no reference has been made for providing an arrangement whereby each of the positions between the "start" and "locked" or "off" positions of the mechanism are positively defined. Such defining of the positions can often be provided using mechanism within the electrical switch means.

However, in a preferred arrangement, as shown in FIG. 13, there is again provided a tubular body 27 housing, for rotation, a drive member 26 coupled to a head 25 (in this instance secured to the drive member by a self-tapping screw 70) and a switch 33, a switch operating member 35 having its end engaging a cam surface on the driver 26 and a return spring (in this instance designated 71).

Figure 13:
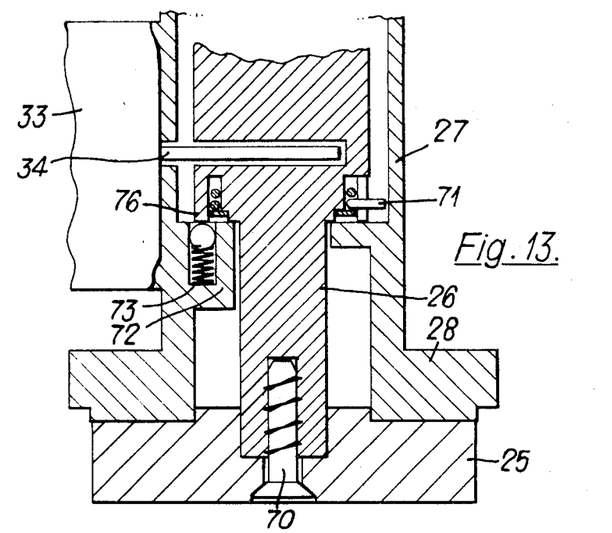
FIG. 13 is a fragmentary sectional view through a preferred embodiment of locking mechanism.

Hpwever the body 27 is provided with an inwardly directed protuberance 72 bored at 73. This bore 73 houses a helical compression spring 74 and a ball 75, the spring 74 biasing the ball 75 into engagement with a notched undersurface of a peripheral skirt 76. Two notches are provided, these notches being positioned on the undersurface of the skirt 76 so that they are respectively engaged by the ball when the drive member 26 is positioned respectively in the "ignition on" position or in a position between the "ignition on" position and the said "off" position, this intermediate position being known as the "accessory on" position.

It will be understood that when the ball 75 engages one of the notches in the skirt 76 the particular position indicated by the notch will be clearly defined and apparent to the operator of the switch mechanism.

Figure 14:
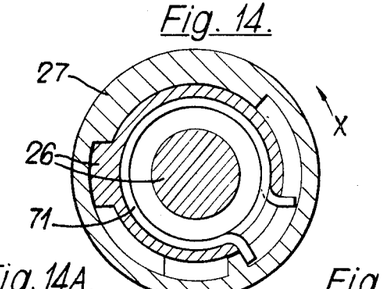
FIGS. 14, 14A and 14B are cross sectional views through the embodiment of FIG. 13 showing the condition of a return spring when the mechanism is in three specific positions with respect to its tubular body.
Figure 14A:
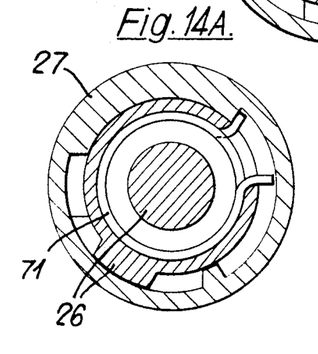
Figure 14B:
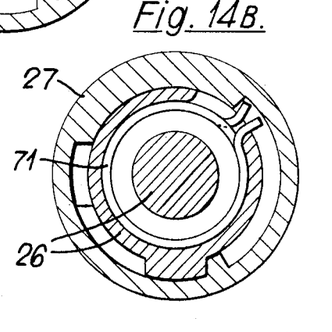

As has been mentioned hereinbefore only general reference has been made to the spring means and such spring means has been described as a helical torsion spring and by reference now to FIGS. 14, 14A and 14B, it will be seen that these figures show the precise structure of the spring 71 of FIG. 13, the condition of the spring being shown in each of three positions of the lock mechanism, i.e., when the driver is in a "locked" position (FIG. 14), when the driver is moved through 60° in the direction of arrow X to an "ignition on" position (FIG. 14A) and when the driver is moved through a further 30° to the "start" position (FIG. 14B). It will be noted that the spring only becomes energised between the "ignition on" and "start" positions.

In certain instances it is desirable to provide additional electrical circuitry to control a visual or aural alarm which is automatically actuated should the key be withdrawn from the lock cylinder when the mechanism is not in a locking condition.

Figure 15:
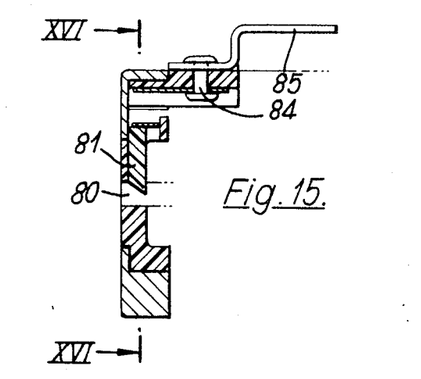
FIG. 15 is a fragmentary sectional view through a cover plate at the key receiving end of a lock barrel.
Figure 16:
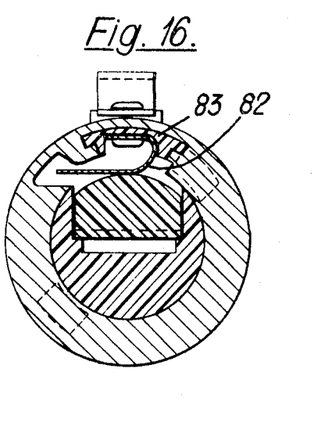
FIG. 16 is a sectional view of the line XVI—XVI of FIG. 15.

This additional circuitry must include a switch actuated in response to movement of the key into or out of the lock cylinder. FIGS. 15 and 16 show such an additional switch mechanism. More particularly the FIGS. 15 and 16 show a key slot opening 80 provided in a rotatable central portion of a fixed cover plate for the lock cylinder end of the mechansim, this opening 80 being closeable by a sliding flap 81. The rotatable portion and flap 81 are fomed of an electrically insulating material (conveniently a plastics material) whereas the remainder of the plate is formed of an electrically conductive material. The flao 81 is urged towards the opening 80 for the purposes of closing such opening by means of a spring electrical contact 82, this spring electrical contact being of generally U-shaped formation and having one arm secured to the plate by means of a rivet 84 (formed of an electrically conductive material) which passes through an electrically insulating carrier member or insert 83. This rivet 84 also clamps an external contact 85 to the electrically insulating insert 83 on the cover plate so that the terminal 85 is in electrical communication with the contact 82 by means of the rivet 84.

When the flap 81 is in its slot closing position the free end of the unsupported arm of the contact 82 engages a portion of the electrically conductive part of the cover plate so that an electrical circuit formed by connecting to the terminal 85 and to the electrically conductive portion of the cover plate is closed when the flap 81 is in a slot closing position. However, this free end portion of the contact 82 is moved away from such electrically conductive portion of the cover plate when the flap 81 is moved under the influence of the key into a slot opening position and such circuit would be broken. It is to be noted however that the contact 82 is only moved when the lock mechansim is in a condition other than in the mechanism locking position. In other words, movement of the flap 81 can only affect the electrical circuitry when the key is withdrawn at a condition when the lock mechanism is in a position other than in the locked condition at which time the flap is aligned with the contact. It will be understood that by providing any simple circuitry co-operating with the cover plate and the terminal 85 a switch is incorporated in such circuit which is responsive directly to movement of the flap 81 and thus is directly responsive to removal and introduction of the key into the slot 80 (which always results in movement in one direction or the other of the flap 81) when the mechanism is in an unlocked condition. The precise construction of the method of producing the electrical contact could, of course, be varied and supplementary spring means could be provided should it be decided that the spring contact 82 should not provide an appropriate form of bias. The electrically conductive portion of the cover plate would normally be formed of a die cast metal and would be in electrical communication with the tubular body of the lock mechanism and it is for this reason that the external contact 85 is clamped by the rivet 84 against the insulating insert 83 provided, this insulating insert 83 being of generally top hat cross section and extending through an aperture in the side wall of the die cast cover plate.

In all the aforementioned embodiments specifically described by way of example the member for effecting the locking of the item to be locked is moved in response to rotary movement of a lock barrel in response to the rotary movement of the key therein and the lock barrel itself is prevented from moving along the axis of rotation of the key, i.e., the longitudinal axis of the barrel and body, with respect to the tubular body.

Figure 17:
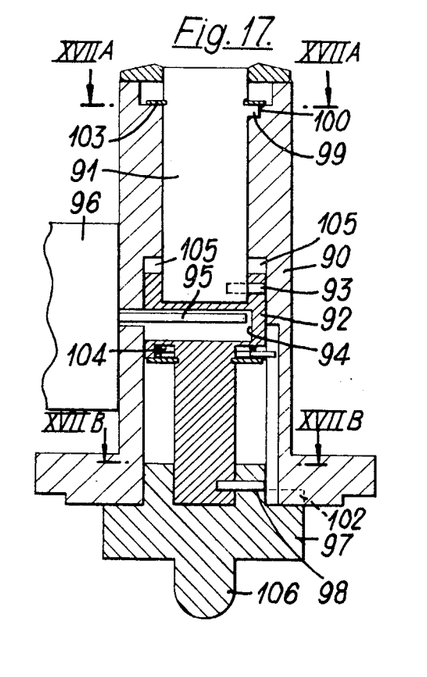
FIG. 17 is a vertical medial sectional view through an alternative construction of lock operating not on a rotary principle but on a "push-pull" system.
Figure 17A:
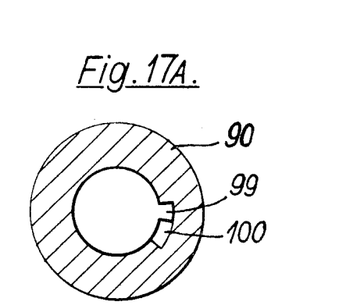
FIGS. 17A and 17B are fragmentary diagrammatic plan views of the embodiment of FIG. 17 respectively taken on the lines XVIIA—XVIIA and XVIIB—XVIIB.
Figure 17B:
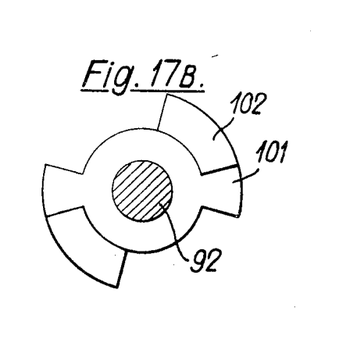

However in a still further embodiment shown in FIGS. 17, 17A and 17B there is provided a tubular body 90 which houses a lock barrel 91 coupled to a drive member 92 by a radially extending pin 93, this drive member including cam means 94 for operating an operating plunger 95 of an electrical switch means 96 and also carrying a drive member head 97. This drive member head 97 is separately formed but is secured rigidly to the drive member 92 by a further radially extending pin 98.

The lock barrel end of the body 90 is rebated at 99 to receive a radially extending boss 100 on such lock barrel 91, the rebate having a width greater than the boss 100 so that the barrel 91 and the drive member 92 may move angularly as a whole with a key about the longitudinal axis of the lock barrel 91 as will hereinafter be described.

The drive member head 97 is provided with a pair of radially extending ears 101, diametrically opposed to one another which are capable of being located in part-circumferential peripheral rebates 102 provided on the periphery at the head end of the tubular body 90. Each of these ears 101 is approximately one third of the overall width of its respective rebate 102. Once the locking head 97 is coupled to the drive member 92 and the drive member 92 in turn coupled to the lock barrel 91 and the lock barrel 91 secured in position in the tubular body by a circlip 103 surrounding such lock cylinder the assembly cannot, of course, be withdrawn from the lock barrel end of the tubular housing 90. It will be seen from FIG. 17 that spring means 104 are also provided.

Broadly in operation the whole assembly within the tubular member is allowed to move longitudinally of the housing to move the head 97 of the drive member 92 towards or away from the head end of the body 90 when this assembly is disposed in one particular rotational position with respect to the body 90 and the extent of such movement is limited by appropriately dimensioned rebates 105 in the tubular body which engage end portions of the drive member 92. When the ears 101 and radial boss 100 are located in their corresponding rebates 102, 99 the drive member 92 may be moved longitudinally of the tubular body from a locked position to an unlocked position (FIG. 17 showing the mechanism depressed but not actually in the locked position) and further the drive member may be rotated through an arc about the longitudinal axis of the locked cylinder to an extend determined by the width of the rebates 99, 102. If desired spring means (not shown) may be provided, in the form of a helical compression spring acting between the tubular body and the drive member, to bias the drive member and its head towards the lock-end of the tubular housing, i.e., towards an unlocked position.

When it is desired to move the lock mechanism towards a locked position the lock barrel drive member 92 and head 97 will be moved axially in response to pressure exerted on a key positioned in the barrel 91 along the length of the tubular body 90 and then in response to rotation of the key in the barrel 91 the head would be rotated so that the ears 101 protruding therefrom move from their position in the rebates to a position where they engage the unrebated portions of the tubular body 90 lying to each side of said rebates 102. It will be understood that once in this "locked" position the head cannot be moved away from its locking position axially of the tubular body 90 until the key has been returned to a position whereby the lock barrel drive member 92 and the head 97 attached thereto is rotated back into a position where the radially extending ears 101 of the head 97 lie in engagement with the said rebates 102.

It will be understood that the purpose of dimensioning the rebates 102 and 99 to be broader than the width of the ears 101 and boss 100 is to permit rotation of the drive member 92 and thus actuation of the electrical switch 96 controlled thereby when the mechansim is in an unlocked condition with the ears 101 and boss 100 riding in the rebates. The purpose of the boss 100 protruding from the lock cylinder is to prevent the unlocked and withdrawn locking head 97 from dropping back into a locking condition, the angular disposition of the ears 101 on the head in respect to the boss 100 on the barrel being such that when the ears 101 are located in any position within their co-operating rebates 102, the boss 100 is located outside its rebate 99. Similarly the lock barrel boss 100 moves into its rebate 99 allowing the cylinder to move axially to permit corresponding movement of the drive member 92 and the drive head 97 immediately before the ears 101 on the drive head 97 engage the ends of their rebates 102 so that such ears drop from the rebates from which they co-operate and the head 97 can be moved to a locking position with the ears 101 preventing the drive head 97 and drive member 92 from being withdrawn from that position until contra-rotation of the key and barrel 91 takes place.

As in the case of certain of the aforementioned embodiments the head may control a locking peg (designated 106 in FIG. 17) coupled directly or formed integrally with the head or alternatively may merely engage a locking element in the form of a free rolling ball, this locking element or ball being adapted to engage a selector shaft of a gear box of a motor vehicle. Because in this instance the head 97 moves with the drive member 92 carrying the same and axially with respect to the tubular housing it is not necessary to rebate the under-surface of the drive head (as is the case in certain other embodiments see reference 35 in FIG. 4), when such head is used in conjunction with a ball.

In the embodiment hereinbefore described it is merely necessary to rotate a key in the lock barrel through approximately 30° to move the mechanism from a locking condition to an unlocked condition and vice versa.

It should be understood that in any one of the aforementioned embodiments provision may be made for the facility that the locking mechanism cannot be moved from an "on" position (as hereinbefore defined) to a "start" position (as hereinbefore defined) on more than one occasion without first moving the assembly back to an "off" position (as hereinbefore defined).

Reference in this specific description of various embodiments has been made wholly to the locking of vehicle transmissions.

It should be understood that lock mechanism as hereinbefore described may be used in various application. Not only could such locks be applied to vehicle steering arrangements, for example, they could also be appled to other items such as static machinery to immobilise the same as a safety precaution, for example, against misuse of the machinery or for the safety of an operative carrying out servicing of the machine.

I claim:

1. A key-operated locking mechanism for locking against movement, a movable shaft, said mechanism comprising:
   a generally tubular housing;
   means on said housing to permit the assembly to be secured to structure lying adjacent the shaft to be locked and to which said shaft is relatively movable when such shaft is unlocked;
   seating means in said housing to receive and locate a key-operated lock barrel;
   a drive member;
   supporting means for supporting for rotary movement about the longitudinal axis of the housing said drive member;
   a shaped surface on the drive member at a position within the housing constituting cam means suitable for transmitting movement to an electrical switch;
   spring means adapted to bias said drive member from one position relative to the housing to another position;
   a separately formed drive member head releasably secured to the drive member; and
   a shaped surface being provided on the head at a position remote from the drive member.

* * * * *